Nov. 5, 1957     C. H. NEWMAN     2,812,116
BEVERAGE DISPENSING APPARATUS
Filed Dec. 13, 1952
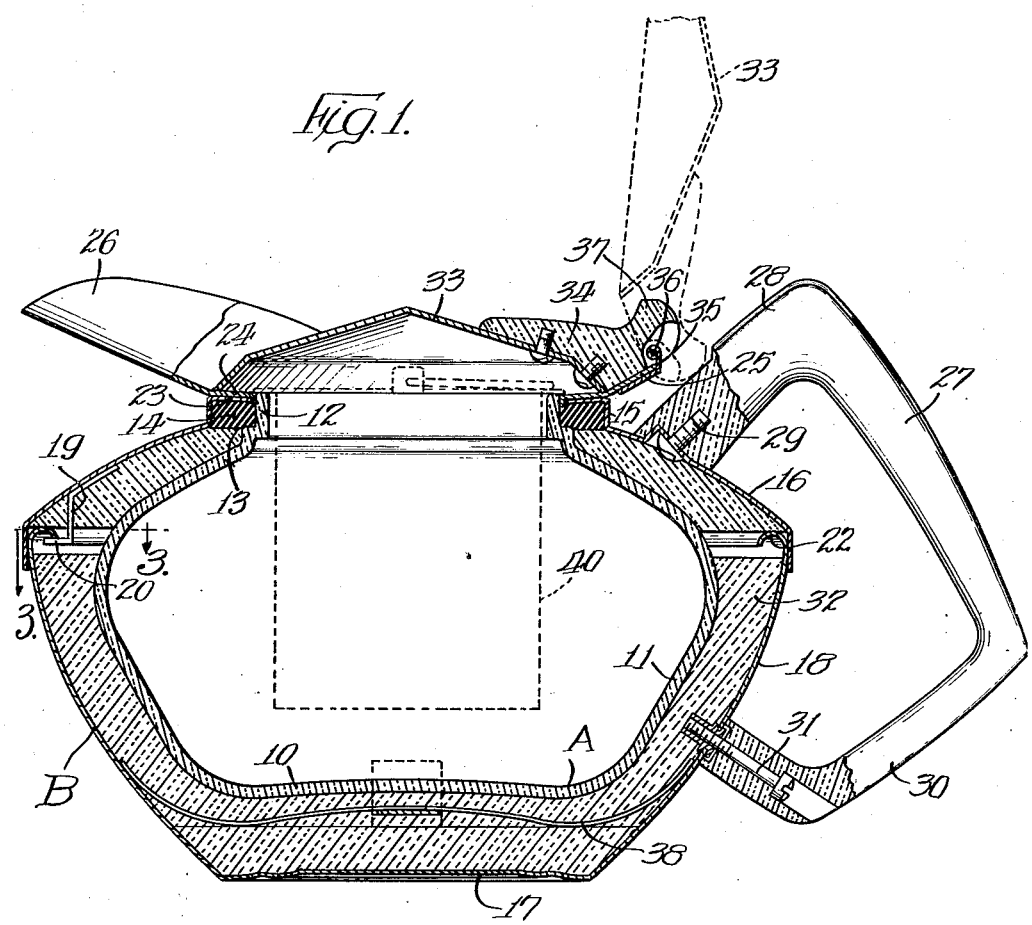
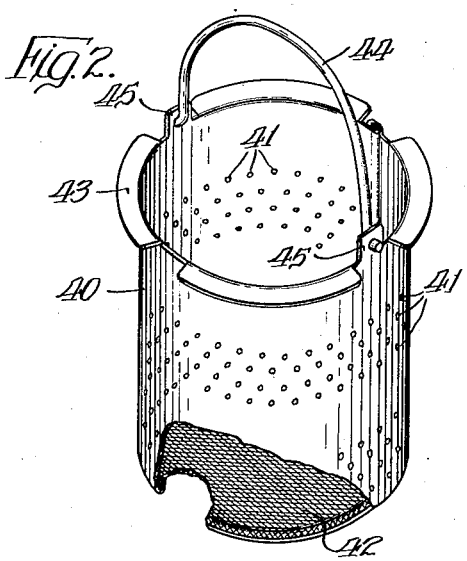
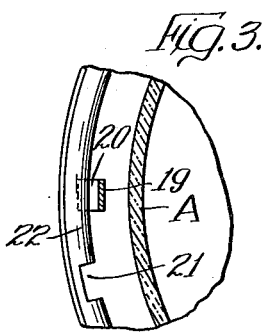
INVENTOR.
Charles H. Newman
BY
Atty:

United States Patent Office 2,812,116
Patented Nov. 5, 1957

2,812,116

BEVERAGE DISPENSING APPARATUS

Charles H. Newman, Northfield, Ill., assignor to Ekco Products Company, Chicago, Ill., a corporation of Illinois Application December 13, 1952, Serial No. 325,793

3 Claims. (Cl. 222—183)

This invention relates to a beverage dispensing apparatus.

It is an object of this invention to provide apparatus of this character in which the temperature of the beverage is maintained for a desirable period of time by means of a vessel having thermally insulated walls.

It is a further object of this invention to provide apparatus of the character indicated which is adapted for the preparation of steeped beverages by means of a removable filtering unit of novel construction designed to contain the substance to be steeped.

These and other objects are attained by the construction hereinafter described and illustrated in the accompanying drawing, wherein:

Fig. 1 is a vertical sectional view through a container embodying the features of the present invention, with parts in elevation, and other parts in dotted lines to show the cover when moved to expose the interior of the vessel.

Fig. 2 is an enlarged top perspective view of a filtering unit constructed in accordance with this invention.

Fig. 3 is an enlarged fragmentary sectional view taken on line 3—3 of Fig. 1.

Referring more particularly to the drawings, an inner vessel for receiving and holding a charge of liquid is designated generally by the letter A and is constructed of heat resisting glass, crockery or other suitable material. Such vessel A is confined within an outer receptacle, preferably of metal, and designated generally by the letter B.

As shown in Fig. 1, the vessel A comprises a decanter-shaped hollow body having a circular bottom 10 and a bulging side wall 11 rising from the periphery of the bottom 10. The mouth of the vessel is defined by a cylindrical neck 12 forming a reduced upward extension of the side wall 11. An annular shoulder 13 at the base of the neck 12 is engaged by an endless ring 14 of rubber or rubber-like composition, of uniform cross-sectional contour throughout its circumference, stretched around the neck 12. The upper surface of the ring is flat in a plane slightly below and parallel to the upper rim of the neck 12.

The outer metallic receptacle B is preferably of such diameter and depth as to accommodate arrangement of the vessel A therein with the side walls of the vessel in concentric radially spaced apart relation to the side walls of the receptacle B and the bottom of the vessel A in upwardly spaced relation to the bottom of the receptacle B. As shown, the latter comprises an upper section having a cylindrical collar 15 of such size as to have a close fit with the outer peripheral surface of the ring 14. A flange 16 formed integrally with and extending outwardly and downwardly from the base of the collar 15 is joined to the upper edge of a cup-shaped section having a bottom wall 17 surrounded by an upwardly extending side wall 18, whereby said upper section and said cup-shaped section combine to form the receptacle B. The aforesaid sections are locked against separation by a simple bayonet type connection. For this purpose, the inner surface of the flange 16 is fitted with a depending bracket 19 at suitable intervals spaced apart peripherally thereof, each bracket having a radial lug 20 which is adapted for passage downwardly through a matching opening or notch 21 formed in a flange 22 extending inwardly from the side wall of the cup-shaped section of the receptacle B for upward engagement with the bottom edge portions of said flange 22 away from said notch as shown in Fig. 3.

A continuous flange 23 extending radially inwardly from the upper edge of the collar 15 has downward engagement with the sealing ring 14 and presents an upper surface in a plane slightly below the upper edge of the neck 12. A separate rim member having an open area matching the opening defined by the upper edge of the neck 12 includes a flat inner marginal base portion 24 joined in face to face relation with the upper face of the flange 23 by soldering or other suitable connection. The base portion 24 presents an upper surface substantially flush with the upper edge of the neck 12 and an integral upwardly and outwardly inclined flange 25 forms the outer border of said rim member. At one side of the rim the flange 25 is extended radially and shaped to provide a pouring spout 26.

A U-shaped handle 27 has one arm 28 thereof secured as at 29 to the skirt 16 and its other arm 30 secured as at 31 to the side wall 18 of the receptacle B so as to occupy a position diametrically opposite the pouring spout 26. The handle 27 is preferably of insulating material.

The space between walls of the vessel and the opposed surfaces of the receptacle B is filled with insulating material of suitable composition whereby the contents of the vessel may be kept at a desired temperature. The cover for the vessel is shown to comprise a circular body designated by the numeral 33 which is of such diameter as to fit within the area defined by the junction between the flat base portion 24 and the upwardly slanting flange 25 of the rim member surrounding the mouth of the vessel. A knob 34 of insulating material secured by screws or the like to the cover 33 and a bracket 35 secured to the portion of the rim at the side of the receptacle B from which the handle extends, have a hinged connection as at 36 whereby the cover is movable into an upright position (as shown in dotted lines in Fig. 1) clear of the area directly above the mouth of the vessel and the base of the rim member surrounding said vessel mouth. An extension of the knob 34 as at 37 presents a finger engaging surface for tilting the cover into upright position.

A spring member 38 acting between the bottom 10 of the vessel A and the side wall 18 of the lower section of the receptacle B exerts pressure on the bayonet joint connecting the upper and lower sections of the receptacle B to secure said sections against separation and also compresses the resilient ring 14 sufficiently to insure the watertight character of the joint between the neck 12 of the vessel and the flange 23 of the collar 15.

Reference numeral 40 denotes a cylindrical filter having a side wall provided with perforations 41 and a woven wire mesh bottom wall 42 seamed or otherwise connected to the lower edge of the concave wall side. Outwardly extending flanges 43 at the upper rim of the container 40 have downward engagement with the flat base portion 24 of the rim member surrounding the mouth of the vessel V for supporting the container within the vessel A so that liquid entering the vessel A passes through the perforations of the container. The perforations so provided in the container walls and bottom are of such size as to prevent sifting of tea leaves or similar material deposited in said container while subjecting such tea leaves to infusion by pouring hot water into the container and through said tea leaves. For this purpose the perforations in the side of the container are each approximately .040 inch diameter and so distributed as to present an open area of 23% of the total area of the wall portion containing such perforation. The perforations provided by the screen bottom are of slightly smaller area but of such density as to provide an open area of 49% of the total area of the bottom. As a consequence the water will drip through the openings in the bottom with sufficient rapidity to avoid overflowing the top edge of the container as the quantity of water poured thereinto is increased and the tea leaves undergo swelling by action of the water thereon.

The container is preferably provided with a wire bail 44 pivoted to ears 45 extending upwardly from diametrically opposed upper edge portions of the container 40 to provide a convenient handle for lifting the container out of the vessel as desired or for lowering the same into operative position within the vessel. It will be noted that the bail folds into a flat lowered position against the rim surface 24 surrounding the entrance to the vessel and within the area underlying the cover 33 when the latter is in lowered operative position.

What is claimed is:

1. A beverage dispensing apparatus comprising a decanter-shaped beverage containing vessel having an annular bulging side wall rising from the periphery of the bottom wall and having a top discharge and filling opening defined by the upper edge of a neck which forms a reduced upward extension of said side wall, an upwardly facing annular shoulder extending outwardly from said neck in downwardly spaced parallel relation to said upper edge, a resilient sealing ring having downward engagement with said shoulder and stretched about the neck of the vessel, a metallic collar telescoped over the outer peripheral surface of the sealing ring, said collar having an inwardly extending upper flange with which the upper surface of the ring is engageable, and an outwardly and downwardly extending lower flange in spaced relation to the wall of the vessel adjoining the base of the neck, a metallic cup having a bottom wall surounded by an upwardly and outwardly extending side wall having its upper marginal portion telescopically interfitted with and rigidly secured to the lower marginal portion of the lower flange of the collar aforesaid with the surfaces of the cup in spaced relation to the surfaces of the vessel opposite thereto, and resilient means acting between the bottom of the vessel and the bottom surface of the cup opposite thereto to urge the vessel toward a position wherein the sealing ring is compressed to a shape compatible with maintaining the upper edge of the neck of the vessel a predetermined distance above the upper flange of the collar, a separate rim member having an opening matching the transverse cross sectional contour of the neck of the vessel supported on and secured to the upper surface of the upper flange of the collar, said rim member having an annular base portion presenting an upwardly facing surface substantially flush with the upper edge of the neck of the vessel and an integral upwardly and outwardly inclined flange shaped to provide a pouring lip.

2. A beverage dispensing apparatus as set forth in claim 1 wherein the space between the vessel and the metal collar and cup contains a filler of insulating material.

3. A beverage dispensing apparatus as set forth in claim 1 in which a U-shaped handle has one arm thereof secured to the lower flange of the collar and the opposite arm secured to the side wall of the cup.

References Cited in the file of this patent

UNITED STATES PATENTS

| | | |
|---|---|---|
| 1,095,959 | Casey | May 5, 1914 |
| 1,680,637 | Rousselot | Aug. 14, 1928 |
| 1,722,696 | Fowler | July 30, 1929 |
| 1,736,381 | Thompson | Nov. 19, 1929 |
| 1,794,641 | Payson et al. | Mar. 3, 1931 |
| 1,882,140 | Haines | Oct. 11, 1932 |
| 1,936,848 | Masury | Nov. 28, 1933 |
| 2,014,120 | Stutz | Sept. 10, 1935 |
| 2,301,917 | Johnson | Nov. 17, 1942 |
| 2,327,258 | Gramp | Aug. 17, 1943 |